United States Patent Office 3,073,812
Patented Jan. 15, 1963

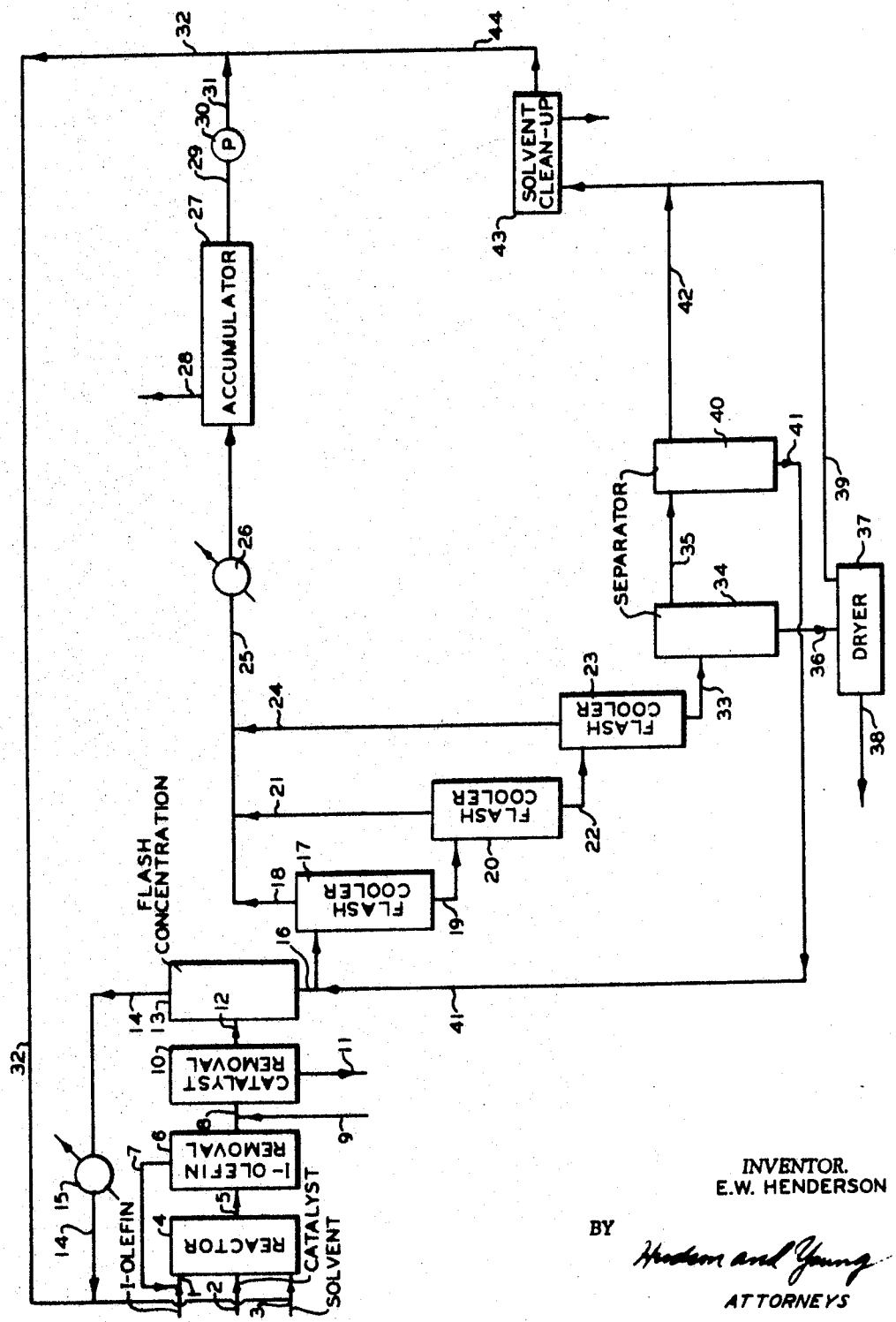

3,073,812
RECOVERY OF OLEFIN POLYMERS FROM SOLUTION
Eulas W. Henderson, Borger, Tex., assignor to Phillips Petroleum Company, a corporation of Delaware
Filed Jan. 7, 1960, Ser. No. 1,021
10 Claims. (Cl. 260—94.9)

This invention relates to the recovery of solid olefin polymers from solution. In one aspect it relates to an improved process for precipitating solid olefin polymers from solution by cooling. In another aspect it relates to an improved process for recovering olefin polymer precipitated from solution.

As used herein, the term solid polymers includes, in addition to the normally solid materials, those polymers of low molecular weight which are tacky in nature and also semi-colid waxy type polymers.

Solid olefin polymers treated in the method of this invention are prepared by a number of methods which usually result in a product which is dissolved in a diluent or solvent material. Inasmuch as the polymers are used primarily in a solid condition, it becomes necessary to precipitate or otherwise remove the solid polymer from solution. Various methods have been proposed for this purpose; however, difficulties have arisen in that the characteristics of the polymer products obtained by conventional methods appear to be greatly affected by the particular separation process employed. Thus, in one process the polymer is precipitated from solution in a "superfine" condition of sub-division which makes it difficult to effect recovery of the precipitated solid from the solvent. In another method, the precipitated polymer contains a quantity of small particles which forms imperfections when the polymer is formed into a film product. These imperfections, which are usually of a size to be just perceptible to the eye, are sometimes called "fish eyes" in the art. In another method of treatment, the polymer removed from solution is stringy or fibrous in nature and, therefore, does not provide the type of product which is readily recovered from the solvent by filtration, centrifugation or other conventional means. It is desirable to obtain a homogeneous product that is a solid polymer having a substantially uniform product size or range of size so that separation of the precipitated material from the solvent is readily effected and quality control of finished products of the polymer can be established.

One method overcomes these difficulties by the precipitation of polymer from solution in a precipitation operation in which the solution is introduced into a cooling zone from which heat is removed by auto-refrigeration, namely, by reducing the pressure on the solution. The rate of pressure reduction is controlled to provide a substantially uniform rate of temperature decrease in the solution whereby polymer is precipitated.

In a copending application of John E. Cottle, Serial No. 687,133, filed September 30, 1957, now Patent Number 2,952,671, a method of operation which overcomes these difficulties has been proposed. In carrying out this improved process the precipitation of the solid polymer is effected by cooling the solution containing solid olefin polymers at a controlled rate to provide a substantially uniform rate of temperature decrease; the precipitated polymer is then separated from the polymer solution and the polymer solution is recycled ot the precipitation step whereby the quantity of polymer precipitated from solution is increased.

The method of this invention is related to the above processes and constitutes an improvement over said processes.

It is an object of this invention to provide an improved process for the recovery of solid olefin polymers from solution.

Another object of the invention is to provide an improved process for the recovery of solid olefin polymers from solution by cooling.

Still another object of the invention is to provide an improved process for increasing the recovery of solid olefin polymers from solution by cooling.

Still another object of this invention is to provide an improved method for controlling the particle size of olefin polymers precipitated from solution.

Yet another object of this invention is to provide an improved method for recovering olefin polymers from solution according to molecular weight.

These and other objects of the invention will become more readily apparent from the following detailed description and discussion.

The foregoing objects are achieved broadly by cooling a solution containing solid olefin polymers at a controlled rate to provide a substantially uniform rate of temperature decrease whereby a portion of the solid polymer is precipitated, separating the precipitated polymer from the polymer solution, concentrating the precipitated polymer into fractions according to size of the polymer particle and recycling the fine polymer particle fraction to the precipitation step whereby the formation of fine polymer particles precipitated from solution is kept at a minimum.

In one aspect of the invention, substantially all of the polymer is precipitated in one vessel.

In another aspect of the invention, substantially all of the polymer is precipitated in a series of cooling vessels whereby the process is made a continuous operation.

In still another aspect of the invention the low molecular weight fraction of the precipitated polymers is separrated and recycled to the precipitation zone whereby the size of the polymer particle obtained from solution is favorably effected. In still another aspect of the invention, a series of cooling vessels is used to precipitate the polymer which is separated into fractions containing higher and lower molecular weight polymers and the fractions containing the lower molecular weight polymers is recycled to the precipitation step whereby control of the molecular weight of the precipitated polymer is obtained.

The polymers which are treated within the scope of this invention include a wide variety of olefin polymers, such as, for example, polymers or copolymers of monoolefins such as ethylene, propylene, butylene, etc., also copolymers of monoolefins and diolefins such as butadiene, isoprene, etc. The invention is particularly applicable to polymers of 1-olefins having a maximum of 8 carbon atoms per molecule and no branching nearer the double bond than the 4-position and more particularly to polymers of ethylene which have a specific gravity of 0.920 to 0.990 at 20° C., and a molecular weight of 35,000 to 280,000 when measured by methods hereinafter described.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids, the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

The concept of molecular weight is fully discussed in

Hogan and Banks Patent No. 2,825,721, issued March 4, 1958. Unless otherwise specified, the term "molecular weight" as used herein means molecular weight based on inherent viscosity using the Staudinger equation (molecular weight=$2.445 \times 10^4 \times$ inherent viscosity).

A preferred polymerization method is described in detail in the patent of Hogan and Banks, Patent No. 2,825,721, issued March 4, 1958. This particular method utilizes a chromium oxide catalyst, containing hexavalent chromium, with silica, alumina, silica-alumina, zirconia, thoria, etc. In one embodiment of this patent, olefins are polymerized in the presence of a hydrocarbon diluent, for example an acyclic, alicyclic or, less preferably, an aromatic compound which is inert and liquid under the reaction conditions. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymer prepared by both methods are also characterized by their high densities and high percentage of crystallinity at normal atmospheric temperatures.

Other less advantageous procedures which employ different catalyst are also used for preparing olefin polymers. For example, polymers are prepared in the presence of organometallic compounds such as triethylaluminum plus titanium tetrachloride, mixtures of ethyl aluminum halides with titanium tetrachloride, and the like. Another group of catalyst which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is usually maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. If it is desired to carry out the process in the vapor state much lower pressures, down to atmospheric, can be employed. When utilizing a fixed bed the space velocity varies from as low as about 0.1 to about 20 volumes of feed per volume of catalyst, with the preferred range being between about 1 and about 6 volumes per volume per hour. When operating with a mobile catalyst it is desirable to maintain the catalyst concentration in the reaction zone between about 0.01 and about 10 percent by weight. Residence time can be from 10 minutes or less to 10 hours or more.

In general, the quantity of diluent is relative to the olefin feed material. Usually the olefin constitutes between about 0.1 and about 25 percent by volume of the mixture and preferably between about 2 and about 15 percent by volume. The solvent or diluent employed in the polymerization reaction includes, in general, saturated hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents are not normally used because they (or impurities therein) tend to shorten the catalyst life; however, if catalyst life is not an important factor in the process, solvents of an aromatic nature can also be employed. All of the foregoing and in addition, other hydrocarbon diluents which are relatively inert, nondeleterious, and in the liquid state at the reaction conditions can also be employed in carrying out the reaction of olefins to form solid polymers.

Various methods have been proposed for the removal of the dissolved polymers from solution in a usable form. In one proposed method, effluent from a polymerization reaction of the type above described, comprising a mixture of olefin polymer and hydrocarbon solvent which has been treated for the removal of catalyst and unreacted olefin, is introduced to a batch cooling zone. Generally, several zones are provided in parallel so that reaction effluent is continuously entering at least one zone. However, if desired, the operation can be carried out with only one cooling zone by providing surge capacity for the reaction zone effluent. After filling of the cooling zone is completed, the flow of material thereto is stopped and cooling of the solution in the zone is commenced whereby there is provided a uniform controlled decrease in temperature. The solubility of the olefin polymers in the solvent material is a function of temperature and as the material is cooled, polymer begins to precipitate from solution. The cooling process is continued until substantially all the polymer is precipitated. The precipitated polymer is then passed through a series of separation steps wherein the precipitated polymer is separated from the solvent.

It has not been possible to precipitate all of the polymer from the solution in a uniform particle size. In addition, it has not been possible to recover all of the precipitated polymer in the separation step because of the presence of polymer particles that are smaller than desired. Thus the diluent after recovery of the precipitated polymer still contains precipitated polymer of very fine size which has heretofore been treated as waste. These very fine particles are treated in the method of this invention as hereinafter described to increase the size thereof and thereby increase the overall recovery of useful polymer.

To provide a product of uniform particle size, the rate of cooling must be carefully controlled to provide a uniform drop in temperature in the polymer solution. Cooling at too slow a rate produces a product having a very fine particle size which is difficult to filter. Shock cooling, on the other hand, frequently produces a jelly-like material which also presents recovery problems. In general, it has been found effective in a batch cooling operation to cool the solution between about 1° F. and about 20° F. per minute, preferably between about 5° F. and about 15° F. per minute. For the best results an even narrower cooling range is employed, namely, from between about 6° F. to about 9° F. per minute. The bulk density of dried product obtained by cooling in this manner varies between about 8 and about 20 pounds per cubic foot, more usually between about 10 and about 12 pounds per cubic feet. The size of the precipitated particles varies usually from between about 50 to about 500 microns.

A number of methods are available for providing the cooling required for carrying out the invention. For example, indirect heat exchange methods employing cooling coils disposed within the cooling zone containing a circulating refrigerant may be used, or a double wall cooling zone with a cooling agent between the walls, etc. Direct cooling methods may also be used. These include injection of cold diluent into the cooling zone, cooling by autorefrigeration, etc. Although any of these methods may be used, the preferred method of operation employs autorefrigeration whereby the cooling required is provided by vaporization of diluent from the solution in the batch cooling zone. When operating in this manner, it is not necessary to provide agitation since boiling of the solvent from the cooling zone serves to create turbulence in the solution. Also, cooling by autorefrigeration substantially eliminates variations in temperature in different parts of the cooling zone, which may be present when other methods of cooling are used. It is desirable to maintain a relatively high ratio of solvent to polymer in the cooling zone. This is easily accomplished when cooling by autorefrigeration by introducing make-up solvent into the cooling zone to replace that vaporized during cooling. Control of the solvent concentration is not possible, of course, when cooling is provided by introducing cold solvent to the cooling zone. It is apparent from the foregoing that the various cooling methods do not provide equivalent results and that autorefrigeration has a number of advantages which recommend it for use in the process of this invention.

The operating temperature range in a batch cooler is determined by the tempearture at which the polymer is precipitated from solution. This in turn is a function of the molecular weight of the polymer and the specific solvent or diluent used. The polymer which is present in the solution comprises materials having a wide range of molecular weight. As a result all of the polymer does not precipitate at single temperature but rather precipitates over a range of temperatures. For example, with an ethylene polymer having a molecular weight of between about 15,000 and about 25,000 it has been found that a substantial portion of the polymer will precipitate from isooctane at about 180° F. and from cyclohexane at about 165° F. When a polymer, e.g. ethylene, having a molecular weight between about 35,000 and about 45,000 is treated substantial precipitation of polymer takes place from cyclohexane at about 170° F. When removing the afore-described polymers from solution, precipitation of the highest molecular weight polymers present in the solution commences about 200 to 225° F. and as the temperature of the solution is reduced lower molecular weight polymers are precipitated from the solution. The practical minimum tempearture which can be obtained is set by the vacuum equipment which is available. Usually it is not desirable to lower the pressure in the precipitation zone below about 4 to 6 pounds p.s.i.a. When processing a solution of polymer in cyclohexane this pressure range establishes a final tempearture in the precipitation zone of between about 105 and about 130° F. When this temperature is reached during the batch cooling cycle the proportion of the polymer which precipitates from solution is usually between about 90 and about 98 percent. Thus, even when the minimum practicable cooling temperature is employed, from about 2 to about 10 weight percent of the polymer remains in solution.

In addition, a minor portion of the precipitated polymer is of such fine size as to be undesirable in the final product. It is the removal of these fine polymer particles to which this invention is directed.

I have now found that the quantity of polymer which precipitates from solution is not only a function of temperature and molecular weight but may also be affected by the introduction into the cooling zone of an amount of a particulate solid olefin polymer of very fine size which provides "a seed" for the polymer in solution to precipitate on thereby producing a substantially larger particle. In the method of this invention substantially all of the polymer which would normally be precipitated from solution is recovered by separating the fine polymer particles and introducing said particles into the precipitation zone to provide nuclei for the precipitating polymer.

As previously mentioned, prior art methods of recovering solid polymers from solution by precipitation have suffered from a number of disadvantages and in many instances the physical properties of the recovered polymer have been such as to make separation of precipitated polymer from the solvent extremely difficult. In the method of this invention, the polymer is precipitated as a substantially homogeneous product in that it contains particles having substantially uniform characteristics and within a range of size so as to make them easily separated from the liquid by conventional separation means such as for example, filtration, centrifugation, etc. In addition, the homogeneity of the product obtained by this invention has made close quality control of finished polymer products possible. Also the products of this process are superior in gloss, color and odor to olefin polymers prepared by other processes.

In order to more clearly describe the invention and provide a better understanding thereof, reference is had to the accompanying drawing which is a diagrammatic illustration of a system for recovering polymer from solution, including a reaction and catalyst separation system, a series of flash coolers for the continuous removal of polymer from solution by precipitation, associated auxiliary equipment and two separators operating in series to separate the polymer into fractions according to size of particles.

Referring to the drawing, 1-olefin, catalyst and solvent are introduced to reactor 4 through conduits 1, 2, and 3 respectively. For ease of handling the catalyst is slurried in the solvent before it is introduced to the reaction zone. During polymerization, the material in the reactor is maintained in a highly agitated state by means of mechanical mixer or other conventional mixing means. The reaction is carried out at elevated temperatures and pressures for a sufficient period of time to convert the major portion of the 1-olefin feed to polymer. Upon leaving the reactor 4, the reaction product is passed via conduit 5 to a separation zone 6 wherein a stream comprising principally unconverted 1-olefin and some solvent is separated and returned to the reactor through conduit 7. Following this step, the reaction zone effluent is heated (not shown) in order to assure dissolution of the entire polyolefin product. Usually, additional solvent is introduced prior to or during this operation through conduit 9. It is preferred that the reaction product before further treating be separated from solid catalyst. The reaction product is passed via conduit 8 to catalyst removal zone 10, which may be a filter, centrifuge, etc., designed to operate at superatmospheric pressure. The separated catalyst which is removed through conduit 11 can be recycled to the reactor 4 or discarded. As necessary all or part of the recycled catalyst can be subjected to a regeneration treatment with oxygen for the removal of heavy polymers deposited thereon during polymerization. Following catalyst removal the effluent stream, now comprising principally a solution of polyolefin, is passed via conduit 12 to a flash concentrator 13. Solvent is vaporized in this vessel, removed through conduit 14, cooled in exchanger 15 and combined with the recovered solvent feed to the reactor via conduits 32 and 3. In this manner, the concentration of solvent is reduced to the level desired for the cooling operation. Removal of solvent at flash concentrator 13 is effected by reducing the pressure, increasing the temperature, or both.

Material from flash concentrator 13 passes through conduit 16 into the first flash cooler 17. This portion of the process may be batch or continuous in nature and any number of flash coolers may be provided in series wherein the temperature is uniformly decreased from the temperature of the flash concentrator to a temperature below the precipitation temperature of the polymer. In this specific example, 3 flash coolers are provided in series for continuous operation. In flash cooler 17 a portion of the solvent vaporizes and passes through conduit 18, conduit 25, condenser 26 and into accumulator 27. That portion of the material condensed in 26 is removed from the accumulator through conduit 29 and transferred by means of pump 30 through conduits 31, 32 and 3 for combination with the solvent feed to the reactor. The reduction in pressure on the last cooler 23 is effected by vacuum pumps (not shown) which communicate with conduits 21 and 24. As solvent vaporizes and the temperature in flash cooler 17 is reduced, polyolefin begins to precipitate from the solution. The pressure in flash cooler 17 is maintained at a constant level. If desired, agitation can be provided in the batch cooler. However, usually the turbulence created by evaporation of the solvent is adequate to prevent precipitated polymer from settling to the bottom of the cooler. In addition, the turbulence which exists during the cooling portion of the cycle also assists in preventing variations in temperature in different areas of the cooling zone. The slurry thus produced in flash cooler 17 is continuously removed via conduit 19 into flash cooler 20 which is maintained at a lower pressure than flash cooler 17. The vaporized solvent is removed via conduit 21 through conduit 25. In flash cooler 20 the temperature and pressure have been reduced so as to result in the precipitation of more polyethylene. The slurry thus produced is withdrawn through conduit 22 to flash cooler 23 which will have the desired final operating temperature and pressure. The solvent vaporized in flash cooler 23 is withdrawn via conduits 24 and 25 similar to the exhaustion of the solvent from flash coolers 17 and 20. The temperature and pressure conditions existing in flash cooler 23 are such as to cause almost complete precipitation of the remaining polyethylene, or cumulative about 96 percent of all the polymer originally in solution. The resultant slurry is continuously withdrawn from flash cooler 23 via conduit 33 and introduced to separation means 34 wherein the polymer product is separated from the solvent, unprecipitated polymer and polymer fines. This may be affected by any conventional means such as filtration, centrifugation, etc. However, in this specific example, cyclone separators are employed. It is desirable in the separation means for the particles to be separated into fractions concentrated as to particle size. The line of demarcation will be dictated by what is considered the desirable size of the particle as a product. The particles considered to be acceptable will be removed via conduit 36 and introduced into drier 37 from which the desired polymer product will be removed to the product removal zone via conduit 38. The vaporized solvent from drier 37 will be removed via conduit 39 to a solvent cleanup zone 43 and subsequently returned via conduits 44, 32 and 3 to the reactor. The smaller particles which have not been removed by the separation means will pass via conduit 35, which will be the overflow from a cyclone separator, and will be introduced into separator 40 which may be identical to separator 34 but will be adjusted to provide for separation of much smaller particles from remaining solvent. In separator means 40, which in this specific example is a cyclone separator, the very fine particles remaining in the slurry are removed via conduit 41 and reintroduced into flash cooler 17 via conduit 16. These very fine particles act as a seeds or nuclei for the polymer precipitating from the solution thereby forming larger particles than heretofore possible and resulting in the almost complete elimination of undesirable particle "fines." The overflow from cyclone separator 40 will contain a negligible amount of solid polymer which will be removed with the solvent via conduits 42 and 39 into solvent cleanup zone 43 wherein the solvent will be treated to remove any remaining undesirable substances and the clean solvent thus produced will be removed via conduit 44 into the reactor via conduit 32 along with fresh solvent in conduit 3.

The following data is presented to illustrate a typical application of a preferred embodiment of the invention on a commercial scale.

*Example*

An ethylene polymer is prepared in the presence of a catalyst comprising 2.5 percent by weight of chromium as chromium oxide, containing 2.2 weight percent of hexavalent chromium with silica-alumina (90/10), prepared by impregnating particulate silica-alumina with a solution of chromium oxide, followed by drying and activation in air at gradually increasing temperatures up to 950° F. The polymer is prepared and processed in accordance with the following conditions:

| Flows: | Wt. percent | Lb./hr |
|---|---|---|
| Feed to reactor 4 | | 43,000 |
| Composition— | | |
| Ethylene | 13.40 | |
| Cyclohexane | 86.40 | |
| Catalyst | 0.20 | |
| | 100.00 | |
| Reactor effluent 5 | | 43,000 |
| Composition— | | |
| Ethylene | 5.40 | |
| Cyclohexane | 86.40 | |
| Polyethylene | 8.00 | |
| Catalyst | 0.20 | |
| | 100.00 | |
| Feed to flash concentrator 13 | | 115,000 |
| Composition— | | |
| Ethylene | 0.15 | |
| Cyclohexane | 97.00 | |
| Polyethylene | 2.85 | |
| | 100.00 | |
| Effluent from flash concentrator 16 | | 80,000 |
| Composition— | | |
| Cyclohexane | 96.00 | |
| Polyethylene | 4.00 | |
| | 100.00 | |
| Recycle to flash cooler 41 | | 40,800 |
| Composition— | | |
| Cyclohexane | 98.04 | |
| Polyethylene | 1.96 | |
| | 100.00 | |
| Feed to flash cooler 20 | | 118,720 |
| Composition— | | |
| Cyclohexane | 96.63 | |
| Polyethylene | 3.37 | |
| | 100.00 | |
| Feed to flash cooler 23 | | 114,560 |
| Composition— | | |
| Cyclohexane | 96.51 | |
| Polyethylene | 3.49 | |
| | 100.00 | |
| Feed to separator 34 | | 101,120 |
| Composition— | | |
| Cyclohexane | 96.05 | |
| Polyethylene | 3.95 | |
| | 100.00 | |
| Feed to drier 37 | | 15,928 |
| Composition— | | |
| Cyclohexane | 80.36 | |
| Polyethylene | 19.64 | |
| | 100.00 | |
| Feed to separator 40 | | 85,192 |
| Composition— | | |
| Cyclohexane | 98.98 | |
| Polyethylene | 1.02 | |
| | 100.00 | |
| Overflow from separator 42 | | 44,392 |
| Composition— | | |
| Cyclohexane | 99.84 | |
| Polyethylene | .16 | |
| | 100.00 | |
| Polyethylene product | | 3128 |
| Recycled polyethylene fines | | 800 |
| Polyethylene waste | | 72 |
| | | 4000 |

Although separation equipment limitations do not permit a sharp line of demarcation, "polyethylene fines" are those particles having a "diameter" of less than 10 microns. The polyethylene product therefore will contain particles of which approximately 90-95 percent will be 10 microns or over.

Temperatures: °F.
- Reactor 4 _____ 285
- Catalyst removal 10 _____ 300
- Flash concentrator 13 _____ 240
- Flash cooler 17 _____ 195
- Flash cooler 20 _____ 180
- Flash cooler 23 _____ 120
- Separators 34 and 40 _____ 120

Pressures: P.s.i.a.
- Reactor 4 _____ 500
- Catalyst removal 10 _____ 150
- Flash concentrator 13 _____ 38
- Flash cooler 17 _____ 19
- Flash cooler 20 _____ 15
- Flash cooler 23 _____ 5
- Separators 34 and 40 _____ Atmospheric Precipitation of solid polymers from solution may be carried out in a single zone if desired. When a single batch cooler is used instead of the series illustrated by the preferred embodiment the precipitation is carried out in one vessel only wherein the solution from the flash concentrator is introduced to said batch cooler, the pressure gradually reduced and very carefully controlled so as to provide a constant rate of temperature reduction, namely about 7½° F. per minute. As solvent vaporizes, the temperature in the batch cooler is reduced and polyolefin begins to precipitate from the solution. This operation is continued until a major portion of the solid polymer leaves the solution after which the pressure reduction is ceased. Upon completion of the cooling cycle, the batch cooler is opened and the slurried material withdrawn therefrom and introduced to the separation means as in the present invention. The series of cooling zones provided by applicant's preferred embodiment provides a greater degree of flexibility in that it provides continuity of operation as well as making it possible to recover several polymer products which are characterized by having relatively narrow ranges of molecular weight. The latter embodiment may be achieved by separating the precipitated polymer at each stage of cooling and treating the polymer in the manner of this operation with complete separating means operating for each cooling stage.

The specific method of operation illustrated by FIGURE 1 comprises a preferred embodiment of the invention. However, it is not intended that it be construed in an unduly limiting sense. For example, as previously stated, other methods for providing the cooling required for precipitation of polymers can be used. In addition, the sequence of steps preceding the precipitation process are merely illustrative in nature and other methods for carrying out these steps known to those skilled in the art can be used within the scope of the invention.

Having thus described the invention by providing specific examples, process steps, compositions and structures, it is to be understood that no undue limitations or restrictions are to be employed by reason thereof, variations or modifications are possible within the scope of the invention.

What is claimed is:

1. A process for recovering, from a solution of a solid polymer of a 1-olefin having a maximum of 8 carbon atoms per molecule and no branching nearer the double bond than the 4-position, a solid product, which process comprises introducing said solution into a precipitation zone; removing the heat from the solution at a substantially uniform rate, thereby precipitating the polymer and forming a slurry of polymer in solvent; thereafter introducing said slurry to a separation zone and separating said precipitated polymer and solvent to obtain fractions of precipitated polymer concentrated as to polymer particle size; thereafter recycling a fraction concentrated in small particles of polymer to the precipitation zone and recovering the product in a product recovery zone.

2. The process of claim 1 wherein said polymer and solvent are separated in a series of separating steps.

3. The process of claim 1 wherein the removal of heat from solution is effected in a series of precipitation zones.

4. A process for the recovery from solution of a solid polymer of a 1-olefin having a maximum of 8 carbon atoms per molecule and no branching nearer the double bond than the 4-position a solid product which process comprises introducing said solution into a polymer precipitation zone; removing the heat from said solution at a substantially uniform controlled rate of temperature decrease thereby ultimately precipitating substantially all of the polymer and forming a polymer-solvent slurry; introducing said slurry into a first separation zone and separating a portion of said precipitated polymer from said solvent to recover a first fraction concentrated in large particles of polymer; removing said first fraction to the product recovery zone; introducing the remainder of said slurry into a second separation zone and separating substantially all of the remainder of the precipitated polymer from the solvent to recover a second fraction containing substantially all the remaining particles of polymer; and recycling said second fraction from the second separation zone into said precipitation zone whereby the formation of the smaller polymer particles is decreased.

5. The process of claim 4 wherein the solid polymer of 1-olefin is a polymer of ethylene having a density of 0.920–0.990.

6. A process for the continuous recovery from solution of a solid polymer of a 1-olefin having a maximum of 8 carbon atoms per molecule and no branching nearer the double bond than the 4-position a solid product which process comprises introducing said solution consecutively into a series of precipitation zones from which heat is removed by autorefrigeration whereby solvent is vaporized; maintaining the pressure in each consecutive precipitation zone at a lower pressure than the preceding zone thereby providing a substantially uniform rate of temperature decrease for the polymer solution and thereby precipitating substantially all of the polymer from solution and forming a polymer-solvent slurry; removing said slurry from the precipitation zone; introducing said slurry into a first separation zone and separating a portion of said precipitated polymer from said solvent to recover a first fraction concentrated in large particles of polymer and said first fraction is removed to the product recovery zone; removing the remainder of said slurry from said first separation zone and introducing same into a second separation zone and separating substantially all of the remander of the precipitated polymer from said solvent to recover a second fraction containing substantially all the remaining particles of polymer; and recycling said second fraction to at least one of said precipitation zones thereby reducing the amount of the smaller particles of polymer formed therein.

7. The process of claim 6 wherein the solid polymer of a 1-olefin is a polymer of ethylene having a density of 0.920–0.990.

8. The process for the recovery from hydrocarbon solution of solid polymers of ethylene having a specific gravity of 0.920–0.990 a solid polymeric product which comprises introducing said solution into a first precipitation zone maintained at a uniform pressure of 17–19 p.s.i.a. whereby heat is removed by autorefrigeration thereby causing a precipitation of a portion of the polyethylene from solution and forming a polymer-solvent slurry; continuously removing said slurry from said first precipitation zone and introducing said slurry into a second precipitation zone wherein the pressure is uniformly maintained at 10–17 p.s.i.a. thereby precipitating a portion of the polyethylene from solution and forming a more concentrated polymer-solvent slurry; continuously removing said slurry from said second precipitation zone and introducing said slurry into a third precipitation zone wherein the pressure is uniformly maintained at a pressure sufficient to precipitate substantially all the remaining polyethylene thereby forming a more concentrated polymer-solvent slurry; continuously removing said concentrated slury from said third precipitation zone and introducing said slurry into a first separation zone and separating a portion of the precipitated polymer from said solvent thereby effecting a first recovery of a fraction concentrated in the larger particles of polymer; removing said first fraction to a product recovery zone; continuously removing the remainder of said slurry from said first separation zone into a second separation zone and separating substantially all of the remaining precipitated polymer from said solvent to recover a second fraction containing substantially all of the remaining particles of ethylene polymer; and continuously recycling said second fraction from said second separation zone into at least one of said precipitation zones wherein the small particles of polyethylene form the nuclei for the polyethylene precipitating from solution in said precipitation zone.

9. The process of claim 8 wherein the fraction obtained in said second separation zone is recycled to said first precipitation zone.

10. A process for the recovery of a solid product from solution of a polymer of a 1-olefin having a maximum of 8 carbon atoms per molecule and no branching nearer the double bond than the 4-position comprising introducing said solution into a polymer precipitation zone, removing heat from said solution at a substantially uniform controlled rate of temperature decrease thereby ultimately precipitating substantially all of the polymer and forming a polymer-solvent slurry, introducing said slurry into a first separation zone and separating therein a first fraction of precipitated polymer concentrated in large particles of polymer from said solvent, removing said first fraction to a product recovery zone, introducing the remainder of said slurry into a second separation zone and separating therein a second fraction of precipitated polymer containing substantially all of the remaining particles of polymer from said slovent, said second fraction consisting essentially of fines having a diameter of less than 10 microns, and recycling said second fraction from said second separation zone into said precipitation zone whereby the formation of particles of polymer separable in said first separation zone is increased.

References Cited in the file of this patent
UNITED STATES PATENTS 2,388,160     Krase _____ Oct. 30, 1945
2,858,902     Cottle _____ Nov. 4, 1958